(12) United States Patent
Lea et al.

(10) Patent No.: US 6,560,635 B1
(45) Date of Patent: May 6, 2003

(54) SYSTEM AND METHOD FOR LOCALLY CACHING REMOTE QUERY REPLIES IN AN ELECTRONIC NETWORK

(75) Inventors: Rodger James Lea, San Jose, CA (US); Clement Ka-Mun Lau, Los Altos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/288,995

(22) Filed: Apr. 9, 1999

(51) Int. Cl.[7] .............................................. G06F 15/16
(52) U.S. Cl. ...................................... 709/203; 709/227
(58) Field of Search ................................ 709/201, 203, 709/213–216, 227–228, 245, 328, 330, 332, 316; 710/104; 707/10

(56) References Cited

U.S. PATENT DOCUMENTS

| | | | |
|---|---|---|---|
| 5,420,573 A | | 5/1995 | Tanaka et al. ......... 340/825.24 |
| 5,511,208 A | * | 4/1996 | Boyles et al. ................ 709/223 |
| 5,537,605 A | | 7/1996 | Teece ......................... 395/800 |
| 5,751,963 A | | 5/1998 | Umetsu ....................... 709/223 |
| 5,761,499 A | * | 6/1998 | Sonderegger ................. 707/10 |
| 5,838,970 A | * | 11/1998 | Thomas ....................... 709/316 |
| 6,032,202 A | * | 2/2000 | Lea et al. ....................... 710/3 |
| 6,038,625 A | * | 3/2000 | Ogino et al. ................. 710/104 |
| 6,085,030 A | * | 7/2000 | Whitehead et al. ......... 709/203 |
| 6,157,925 A | * | 12/2000 | Jenkins et al. ................ 707/10 |
| 6,157,942 A | * | 12/2000 | Chu et al. ................... 709/203 |
| 6,185,611 B1 | * | 2/2001 | Waldo et al. ................ 709/221 |
| 6,199,136 B1 | * | 3/2001 | Shteyn ........................ 710/129 |
| 6,216,158 B1 | * | 4/2001 | Luo et al. .................... 709/217 |
| 6,349,352 B1 | * | 2/2002 | Lea ............................... 707/1 |
| 6,477,573 B1 | * | 11/2002 | Lea ............................. 709/224 |

FOREIGN PATENT DOCUMENTS

EP          0618708       2/1994       .......... H04L/29/06

OTHER PUBLICATIONS

Feibel, W., The Encyclopedia of Networking, 2nd ed., Network Press, pp. 946–955, 1996.*

(List continued on next page.)

*Primary Examiner*—Patrice Winder
*Assistant Examiner*—Andrew Caldwell
(74) *Attorney, Agent, or Firm*—Gregory J. Koerner; Simon & Koerner LLP

(57) ABSTRACT

A system and method for locally caching remote query replies in an electronic network comprises a local registry that performs a local query for a local software module to locate a target software element for a network messaging process. If the local query is unsuccessful, the local registry responsively creates a remote query based on the unsuccessful local query, and then broadcasts the remote query to remote registries across the electronic network. The local registry then evaluates the remote query replies and stores a remote element registration into a local cache for each successful remote query reply. The local software module may then locally identify those remote target software elements with which the local software module frequently communicates, to facilitate efficient network messaging processes.

8 Claims, 9 Drawing Sheets

OTHER PUBLICATIONS

Znati, T., et al., A Simulation Based Analysis of Naming Schemes for Distributed Systems, Proc. of the 25th Annual Simulation Symposium, IEEE, pp. 42–51, 1992.*

Copyright 1997, 1998 by Grundig, Hitachi, Matsushita, Philips, Sharp, Sony, Thomson and Toshiba; The HAVi Architecture, Version 0.8, Specification of the Home Audio/Video Interoperability (HAVi) Architecture; May 11, 1998; pp. I –XIV and 1–195.

Maintaining Strong Cache Consistency in the World Wide Web by Pei Cao and Chengjie Liu, XP–000740725, pp 445– pp 457, Apr. 1998.

The HAVi Specification, Specification of the Home Audio/Video Interoperability (HAVi) Architecture by Sony,Philips, Hitachi,Sharp,Matsushita,Thomson,Toshiba,Grundig, XP–002118795, pp 1–25, pp 1–22, pp 214–220, Nov. 19, 1998.

Query Caching Method for Distributed Web Caching by Takuya Asaka and Hiroyoshi Miwa, XP–000790217, pp 1931–1935, Oct. 1998.

Operating System Concepts, Fifth Edition, A. Silberschatz, P.B. Galvin, Addison Wesley Longman, Inc., 1998, Chapter 17.

* cited by examiner

SYSTEM AND METHOD FOR LOCALLY CACHING REMOTE QUERY REPLIES IN AN ELECTRONIC NETWORK

CROSS-REFERENCE TO RELATED APPLICATIONS

This application relates to U.S. patent application Ser. No. 09/259,504, entitled "System And Method For Incrementally Updating Remote Element Lists In An Electronic Network," filed on Feb. 26, 1999, to U.S. patent application Ser. No. 09/257,344, entitled "System And Method For Implementing Active Registries In An Electronic Network," filed on Feb. 25, 1999, now abandoned, to U.S. patent application Ser. No. 09/289,498, entitled "System And Method For Performing A Hierarchical Remote Query In An Electronic Network," filed on Apr. 19, 1999, now U.S. Pat. No. 6,471,573, and to U.S. patent application Ser. No. 09/289,500, entitled "System And Method For Maintaining Fully-Replicated Registries In An Electronic Network," filed on Apr. 19, 1999, now abandoned, which are hereby incorporated by reference. The cross-referenced applications are commonly assigned.

BACKGROUND OF THE INVENTION

1. Field of the Invention

This invention relates generally to electronic networks, and relates more particularly to a system and method for locally caching remote query replies in an electronic network.

2. Description of the Background Art

Implementing an effective method for managing communications between software elements that reside on electronic devices within an electronic network is a significant consideration for manufacturers and designers of contemporary electronic devices. An electronic device in a distributed electronic network may advantageously communicate with other remote electronic devices in the network to share and substantially increase the resources available to individual devices in the network. For example, an electronic network may be implemented in a user's home to enable flexible and beneficial sharing of resources between various consumer electronic devices, such as personal computers, digital video disk devices, digital set-top boxes for digital broadcasting, television sets, and audio playback systems.

Managing and controlling efficient communications in a network of electronic devices may create substantial challenges for designers of electronic networks. For example, enhanced demands for increased functionality and performance many require more system processing power and require additional hardware resources across the network. An increase in processing or hardware requirements may also result in a corresponding detrimental economic impact due to increased production costs and operational inefficiencies.

Network size and device functionality are also factors that affect the control and management of an electronic network. Communications in an electronic network typically become more complex as the number of individual devices or nodes increases. Assume that a particular device on an electronic network is defined as a local device with local software elements, and other devices on the electronic network are defined as remote devices with remote software elements. Accordingly, a local software element on the local device may need to communicate with various remote software elements on remote devices across the electronic network. However, successfully managing a substantial number of electronic devices across a single network may provide significant benefits to a system user. Furthermore, enhanced device capability to perform various advanced functions may provide additional benefits to a system user, but may also place increased demands on the control and management of various devices in the electronic network. For example, an electronic network that effectively accesses, processes, and displays digital television programming may benefit from efficient network management techniques because of the large amount and complexity of the digital data involved.

In addition, initiating and managing complex messaging processes between various devices over an extended electronic network may consume substantial amounts of processing resources from the various devices that form the electronic network. For example, as the number of devices and corresponding software elements on an electronic network increase, a given message that is repeatedly propagated to software elements across the electronic network may create an undue amount of network traffic and thus have an adverse effect on overall performance of the electronic network.

Therefore, for all the foregoing reasons, implementing an effective method for managing communications between various software elements in a distributed electronic network remains a significant consideration for designers, manufacturers, and users of electronic devices.

SUMMARY OF THE INVENTION

In accordance with the present invention, a system and method are disclosed for locally caching remote query replies in an electronic network. In one embodiment of the present invention, initially, a local software module creates a local query to locate a desired target software element for a network messaging process. The local software module then preferably propagates the local query to a local registry which responsively performs a local lookup procedure to determine whether any locally-registered software elements satisfy the local query transmitted from the local software module.

In accordance with the present invention, the local lookup procedure includes checking the local registry for a local element registration corresponding to the desired target software element of the query. In addition, the local lookup procedure also preferably includes examining a local cache for a remote element registration corresponding to the desired target software element.

If the local query is successful and a locally-registered software element is found that satisfies the query criteria, then the local registry returns a software element identifier (SEID) corresponding to that locally-registered software element to the local software module, and the query process terminates. However, if the local query is not successful, then the local registry builds a remote query that preferably includes the same or similar criteria as the prior local query. The local registry then broadcasts the remote query to all remote registries located on other devices across the electronic network to locate a remote target software element that satisfies the remote query.

The local registry then preferably gathers remote query replies from all remote registries across the electronic network. The local registry next determines whether the remote query was successful in locating at least one remote target software element for the local software module message. If the remote query successfully locates a remote target software element, then, the local registry creates a remote element registration that corresponds to, and uniquely identifies, the remote target software element.

The local registry then advantageously stores the remote element registration into a local cache, in accordance with the present invention. In some embodiments, the remote element registration preferably includes a unique remote software element identifier (SEID) to identify and locate the remote target software element during a messaging process. The local software module may then locally access the SEID of the remote target software element to efficiently communicate with the remote target software element.

Because the foregoing remote query process typically requires excessive messaging across the electronic network, and also consumes substantial amounts of processing resources, the present invention therefore gradually builds up information in the local cache regarding remote software elements that are of interest to the local software module, to thereby effectively reduce network traffic and decrease query response time. The present invention thus efficiently maintains a local cache of remote query replies in the electronic network.

DETAILED DESCRIPTION OF THE PREFERRED EMBODIMENT

The present invention relates to an improvement in electronic network technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for locally caching remote query replies in an electronic network, and includes a local registry that performs a local query for a local software module to locate a target software element for a network messaging process. If the local query is unsuccessful, the local registry responsively creates a remote query based on the unsuccessful local query, and then broadcasts the remote query to remote registries across the electronic network. The local registry then evaluates the remote query replies and stores a remote element registration into a local cache for each successful remote query reply. The local software module may then locally identify those remote target software elements with which the local software module frequently communicates, to facilitate efficient network messaging processes.

Figure 1:
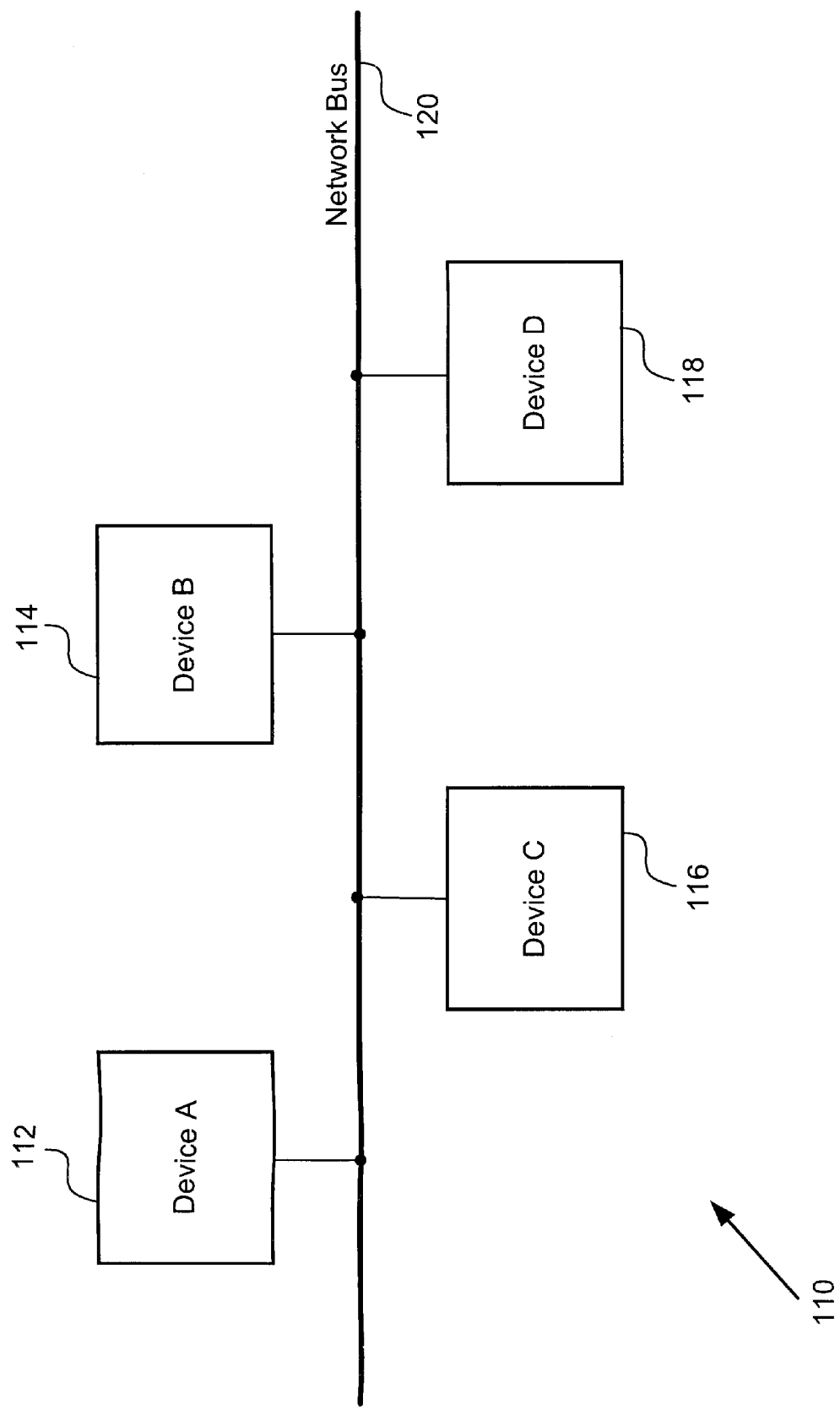
FIG. 1 is a block diagram for one embodiment of an electronic network, in accordance with the present invention.

Referring now to FIG. 1, a block diagram for one embodiment of an electronic network 110 is shown, in accordance with the present invention. In the FIG. 1 embodiment, network 110 includes, but is not limited to, device A 112, device B 114, device C 116, and device D 118. In other embodiments, network 110 may readily be implemented using a larger or smaller number of devices than the four devices (device A 112 through device D 118) shown in the FIG. 1 embodiment.

In the FIG. 1 network 110, device A 112, device B 114, device C 116, and device D 118 preferably communicate with each other through a commonly-shared network bus 120. In the FIG. 1 embodiment, network bus 120 is preferably implemented according to the IEEE 1394 interconnectivity standard. However, in alternate embodiments, other appropriate and compatible interconnectivity standards are also contemplated for use in conjunction with the present invention.

In the FIG. 1 embodiment, network 110 may preferably be configured to operate in accordance with the Home Audio/Video Interoperability (HAVi) core specification (version 1.0 beta, Nov. 19, 1998) which is hereby incorporated by reference. Therefore, device A 112, device B 114, device C 116, and device D 118 may be implemented as various types of consumer electronics devices, including, but not limited to, personal computers, digital video disk devices, television sets, audio reproduction systems, video tape recorders (VCRs), and set-top boxes for digital video broadcasting. However, in various alternate embodiments, network 110 may readily be implemented as any appropriate electronic network configured to permit communication between any desired types of electronic devices.

In the FIG. 1 embodiment, the various electronic devices that form part of network 110 preferably include the following four categories of electronic devices: full devices (FD), intermediate devices (ID), base devices (BD), and legacy device (LD). The foregoing four categories of electronic devices (FD, ID, BD, and LD) are further discussed below in conjunction with FIGS. 2 and 3. In alternate embodiments of the present invention, network 110 may readily includes various other categories of electronic devices in addition to, or instead of, the four categories of FD, ID, BD, and LD.

Figure 2:
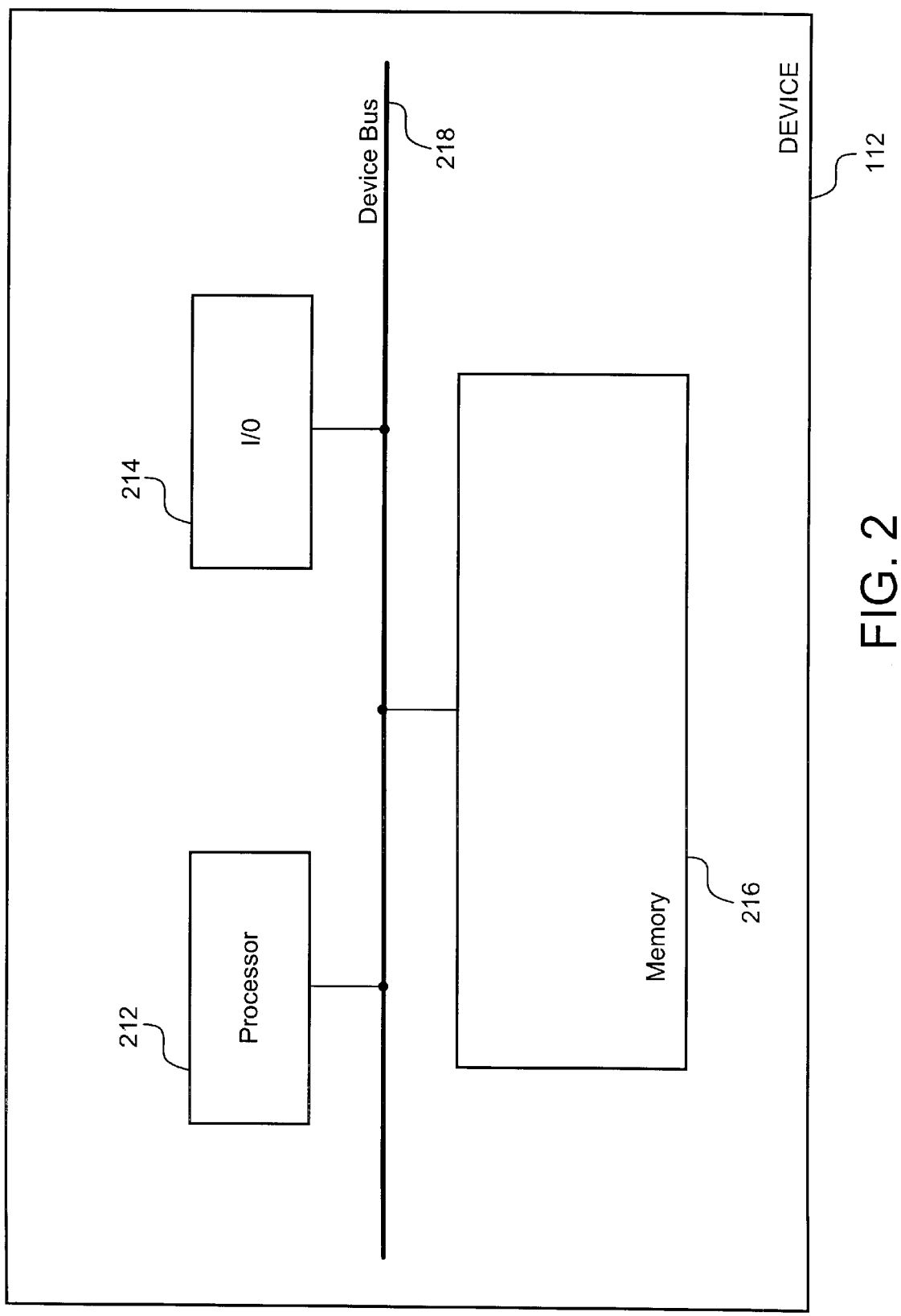
FIG. 2 is a block diagram for one embodiment of an exemplary device from FIG. 1, in accordance with the present invention.

Referring now to FIG. 2, a block diagram for one embodiment of an exemplary device 112 from FIG. 1 is shown, in accordance with the present invention. In the FIG. 2 embodiment, device 112 preferably includes, but is not limited to, a processor 212, an input/output interface (I/O) 214, and a memory 216 that are each coupled to, and communicate with each other via, a common device bus 218. In the FIG. 2 embodiment, device 112 is preferably configured to represent either a full device or an intermediate device, as referred to above in the discussion of the FIG. 1 network 110.

In the FIG. 2 embodiment, processor 212 may be implemented to include any appropriate and compatible generic, multi-purpose microprocessor device. The FIG. 2 input/output interface (I/O) 214 preferably provides an effective interface to facilitate communications between device 112 and network bus 120 (FIG. 1). In the FIG. 2 embodiment, memory 216 may be implemented to include any combination of desired storage devices, including, but not limited to, read-only memory (ROM), random-access memory (RAM), and various types of non-volatile memory, such as floppy disks or hard disks. The contents and functionality of memory 216 are further discussed below in conjunction with FIGS. 3 and 4.

Figure 3:
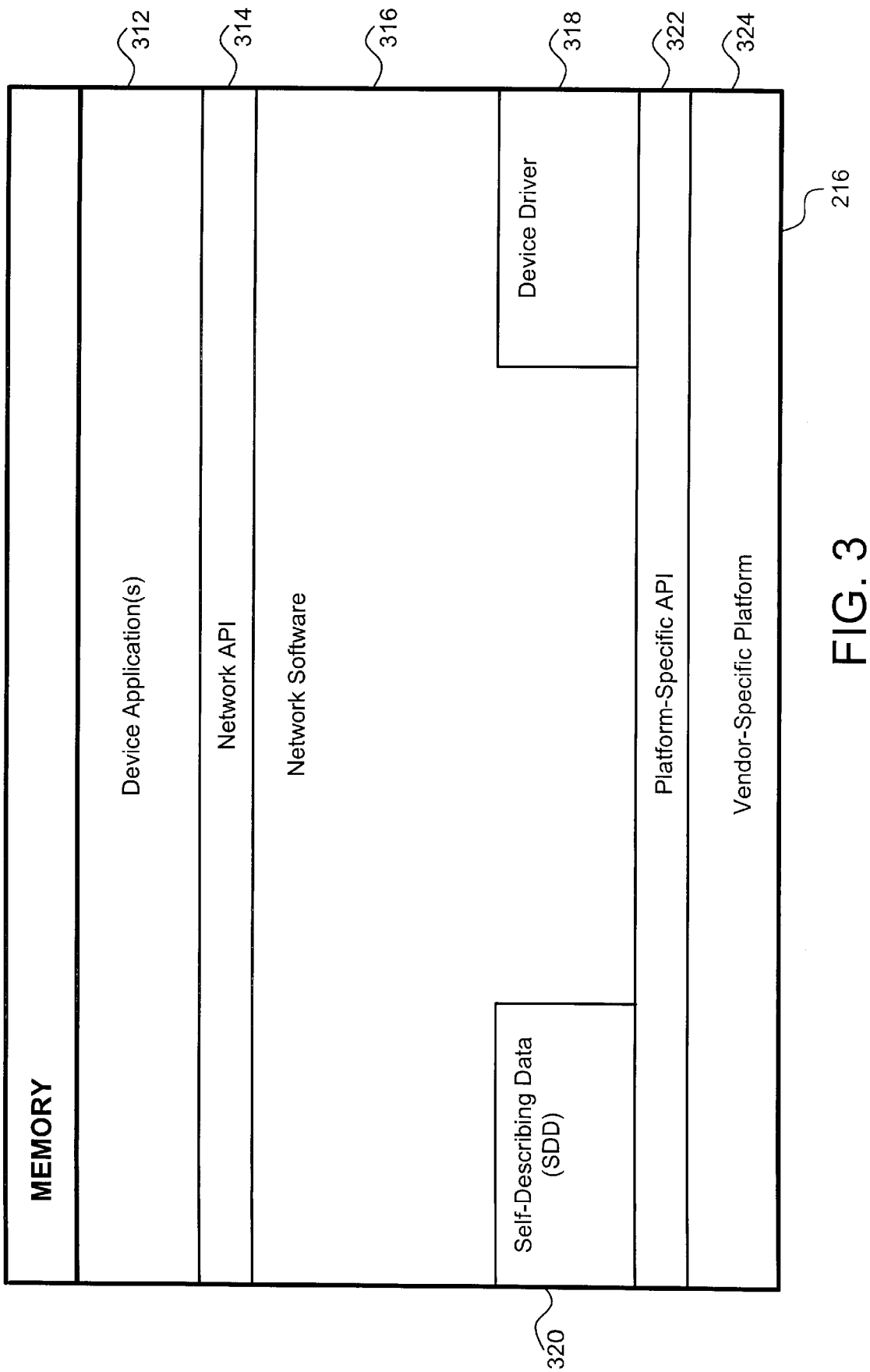
FIG. 3 is a memory map for one embodiment of the memory of FIG. 2, in accordance with the present invention.

Referring now to FIG. 3, a memory map for one embodiment of FIG. 2 memory 216 is shown, in accordance with the present invention. In the FIG. 3 embodiment, memory 216 includes one or more device applications 312, a network application program interface (API) 314, network software 316, self-describing data (SDD) 320, a device driver 318, a platform-specific application program interface (API) 322, and a vendor-specific platform 324. In alternate embodiments, memory 216 may readily include various components and elements that are different from, or in addition to, those software components 312 through 324 discussed in conjunction with the FIG. 3 embodiment.

In the FIG. 3 embodiment, device application 312 preferably includes software instructions that are executed by processor 212 (FIG. 2) to effectively manage and control the functionality of device 112. Network API 314 preferably serves as an interface between various elements of network software 316 and device application 312.

In the FIG. 3 embodiment, network software 316 preferably includes one or more software elements that are executed by processor 212 to advantageously permit device 112 to communicate and cooperate with other devices in network 110. The contents and functionality of network software 316 are further discussed below in conjunction with FIG. 4.

Self-describing data (SDD) 320 preferably includes various types of relevant information regarding device 112. For example, SDD 320 may include information specifying the manufacturer, model, version, serial number, and other fixed data that specifically corresponds to device 112. Device driver 318 preferably includes appropriate software instructions that permit device 112 to communicate with network bus 120 (FIG. 1).

In the FIG. 3 embodiment, platform-specific API 322 provides an interface that preferably permits network software 316 to communicate with vendor-specific platform 324. In the FIG. 3 embodiment, vendor-specific platform 324 may include basic operating system software for supporting low-level operations of device 112.

The FIG. 3 embodiment of memory 216 typically corresponds to a full device (or FD, as discussed above in conjunction with FIG. 1) that preferably includes a complete set of network software 316 to permit optimal compatibility and functionality with network 110. Alternately, memory 216 may correspond to an intermediate device (ID) which includes only a reduced set of software elements from network software 316. In contrast, a base device (BD) is preferably hosted on network 110 by a full device or an intermediate device, and therefore typically does not include network software 316. A base device, however, preferably does include self-describing data 320 and a device driver 318.

A legacy device (LD) may be defined as a device that does not comply with the architectural specifications of network 110 and network software 316. Legacy devices typically were designed and manufactured prior to the design and implementation of network 110 and network software 316. Therefore, a legacy device is preferably hosted on network 110 by a full device or an intermediate device, and typically does not include network software 316 or self-describing data 320. A digital base device, however, may include a device driver 318 for interfacing with network bus 120.

Figure 4:
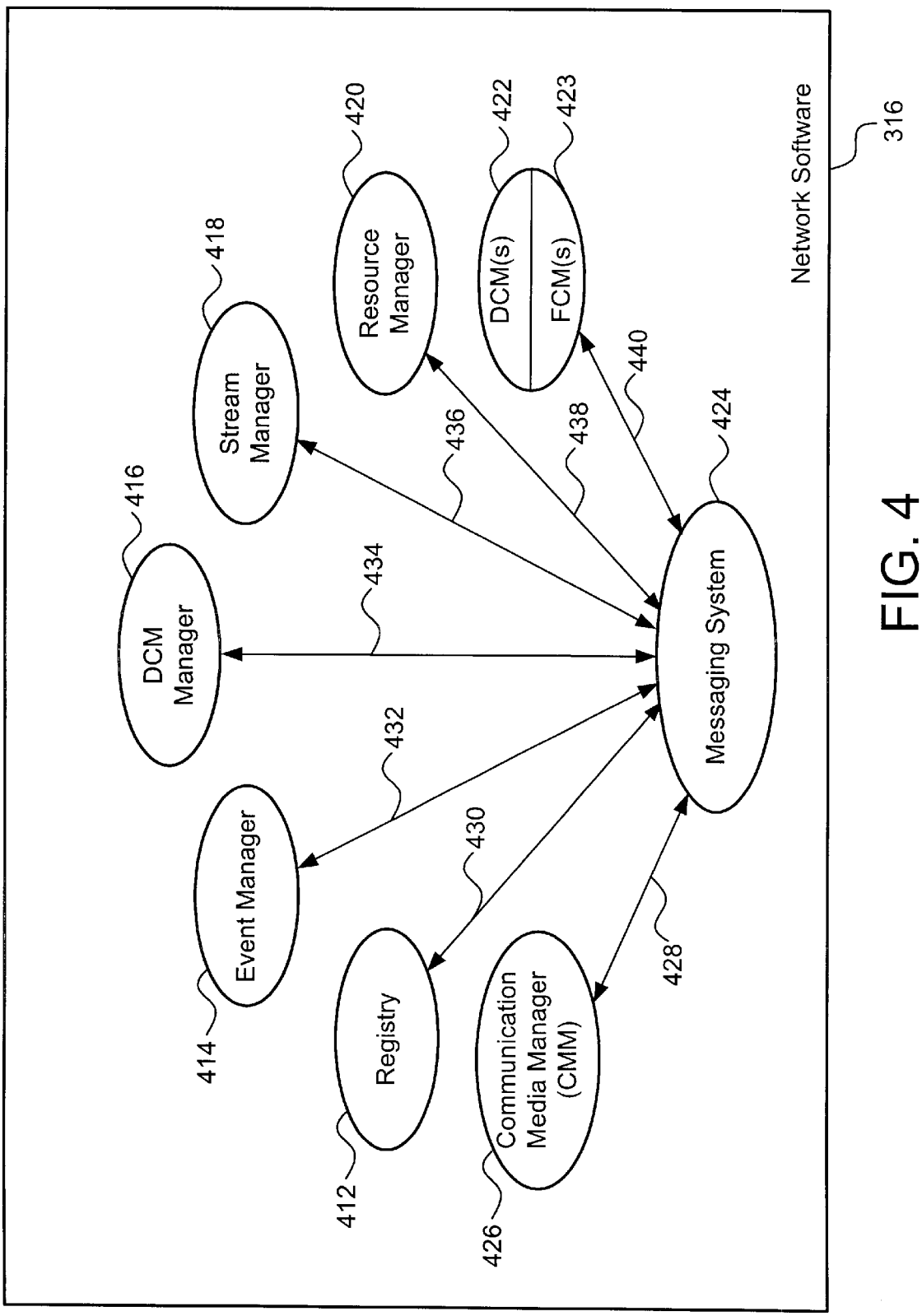
FIG. 4 is a diagram for one embodiment of the network software of FIG. 3, in accordance with the present invention.

Referring now to FIG. 4, a diagram for one embodiment of the network software 316 of FIG. 3 is shown, in accordance with the present invention. In the FIG. 4 embodiment, network software 316 preferably comprises a number of software elements, including a registry 412, an event manager 414, a device control module (DCM) manager 416, a stream manager 418, a resource manager 420, one or more device control modules (DCMs) 422 and one or more corresponding functional control modules (FCMs) 423, a messaging system 424, and a communication media manager (CMM) 426.

In the FIG. 4 embodiment, software elements 412 through 426 are preferably configured to function in accordance with the Home Audio/Video Interoperability (HAVi) architecture which has previously been incorporated herein by reference. However, in alternate embodiments, network software 316 may readily conform to any other appropriate and compatible interoperability architecture, and may also include various software elements that are different from, or in addition to, those elements 412 through 426 that are presented in the FIG. 4 embodiment.

In the FIG. 4 embodiment, registry 412 may preferably include a listing of software elements in network software 316. Registry 412 also preferably may include relevant element information or attributes corresponding to the listed software elements. For example, elements 412 through 426 from network software 316 and corresponding element information may be listed in registry 412. Registry 412 therefore may serve as a directory service for software elements in network 110. Registry 412 may thus allow any software element to obtain a software element identifier (SEID) for identifying and locating another software element in network 110. In accordance with the present invention, registry 412 may also include a remote registry list that identifies all remote registries on network 110.

In the FIG. 4 embodiment, event manager 414 preferably serves as a network-event notification service to notify various software elements (that have previously subscribed for notification) about the occurrence of a specified network event, such as a change in a software element or a change in network 110. DCM manager 416 is preferably responsible for installing and removing DCMs 422 on full devices or intermediate devices. Stream manager 418 is preferably responsible for managing real-time transfer of data and other information between various functional components of network 110.

In the FIG. 4 embodiment, resource manager 420 preferably facilitates the sharing of various resources and scheduling of various actions in network 110. A device control module (DCM) 422 preferably includes a software element that is used to control a specific associated device on network 110. A given DCM 422 preferably includes one or more directly-corresponding functional control modules (FCMs) 423 that each control a specific functional component within the particular device 112 that corresponds to the FCM 423. A full device or an intermediate device may preferably host a DCM 422 to control a remote base device or a legacy device on network 110. In an intermediate device, the hosted DCM 422 is preferably embedded as part of network software 316. In a full device, the hosted DCM 422 may be downloaded from the corresponding remote device in network 110.

In the FIG. 4 embodiment, messaging system 424 is preferably responsible for bi-directionally transferring various messages between the software elements of network software 316. Communication media manager (CMM) 426 coordinates and manages asynchronous and isochronous communications through device driver 318 onto network bus 120. In addition to software elements 412 through 426 of network software 316, a full device may also include a bytecode runtime environment (not shown) to permit the full device to download and execute one or more remote DCM (s) 422 to thereby host and control other devices on network 110.

Network software 316 preferably performs a number of significant and related operations whenever a particular device is removed from, or added to, network 110. When a device is added or removed from network 110, then network bus 120 preferably triggers a bus reset event which notifies all connected devices about the change in network 110. Following the bus reset event, all DCM managers 416 in network 110 preferably perform a negotiation procedure to determine which, if any, DCM manager 416 is the most appropriate host for controlling the newly-added device 112. Each DCM manager 416 in network 110 must therefore maintain a current list of all devices in network 110. Network software 316 preferably also updates relevant software element information in registry 412 whenever a device is removed from, or added to, network 110. In the FIG. 4 embodiment, a given local registry 412 also preferably includes a list of all remote registries 412 in network 110.

Figure 5:
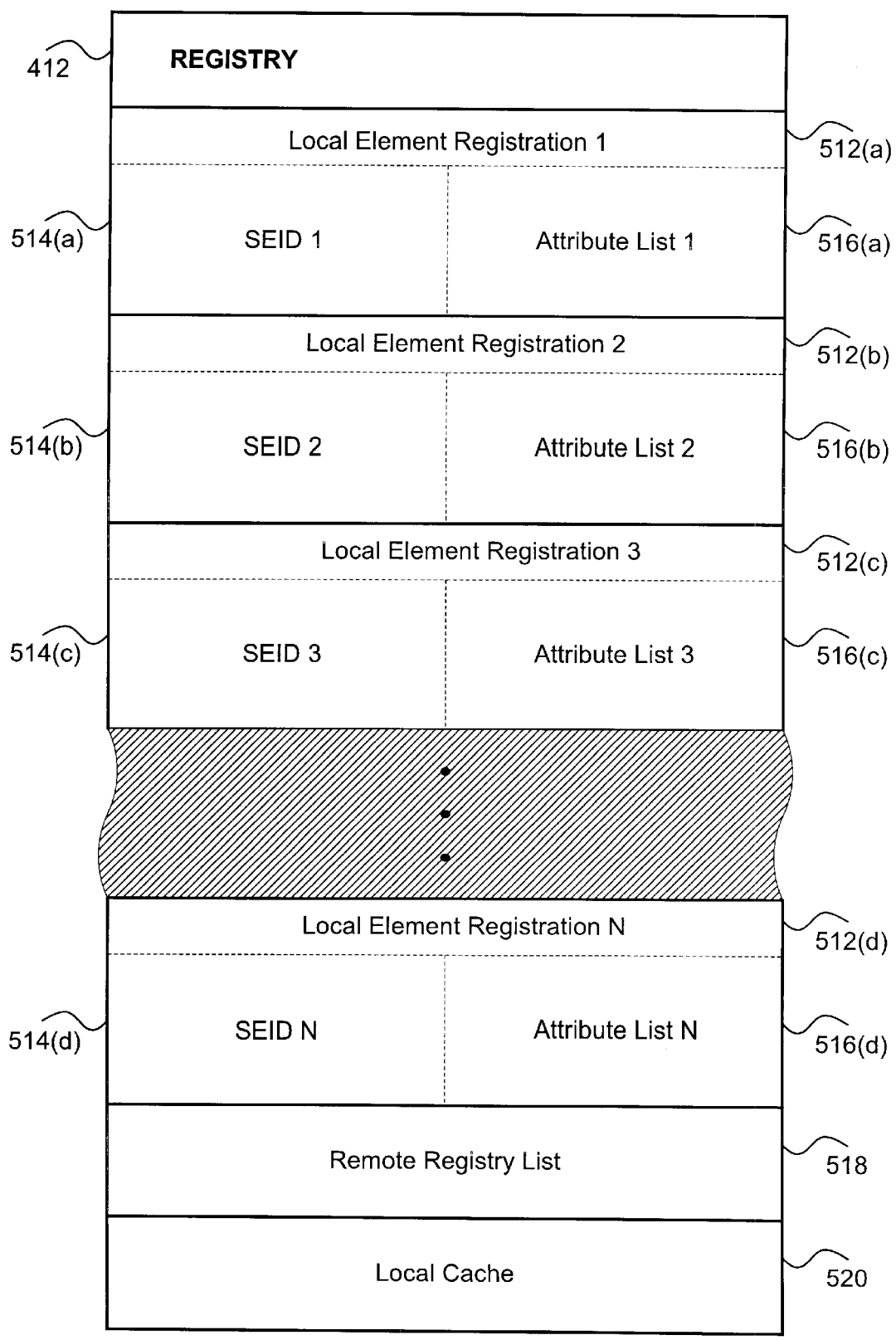
FIG. 5 is a diagram for one embodiment of the registry of FIG. 4, in accordance with the present invention.

Referring now to FIG. 5, a diagram for one embodiment of the FIG. 4 registry 412 is shown, in accordance with the present invention. In the FIG. 5 embodiment, registry 412 preferably includes a local element registration 1 (512(a)) through a local element registration N (512(d)), remote registry list 518, and a local cache 520. Each FIG. 5 local element registration 512(a) through 512 (d) preferably corresponds to a local software element in network 110. For example, any one of local element registration 512(a) through 512(d) may uniquely correspond to an associated software element from network software 316 (FIG. 4).

In the FIG. 5 embodiment, each local element registration 512(a) through 512(d) preferably includes a software element identifier (SEID) and a corresponding attribute list. Therefore, element registration 1 (512(a)) through element registration N (512 (d)) each preferably include a corresponding respective SEID 1 (514(a)) through SEID N (514(d)), and a associated respective attribute list 1 (516(a)) through attribute list N (516(d)). In alternate embodiments, registry 412 may readily be configured to include various components in addition to, or instead of, those shown in the FIG. 5 embodiment.

In the FIG. 5 embodiment, each SEID 1 (514(a)) through SEID N (514(d)) preferably includes a global unique identifier (GUID) and a software element local handle (SELH) that are used to uniquely identify a specific software element in network 110. Attribute list 1 (516(a)) through attribute list N (516(d)) preferably each include relevant information corresponding to the associated software element. For example, such relevant information may include, but is not limited to, an element manufacturer, an element model, a version level, and various other element features. In the FIG. 5 embodiment, remote registry list 518 preferably includes a list of all remote registries on remote devices across network 110.

In the FIG. 5 embodiment, local cache 520 preferably includes remote element registrations for selected remote software elements on remote devices across network 110. In the preferred embodiment, local cache 520 is integral with registry 412 so that local element registrations 512 and the remote element registrations of local cache 520 are not segregated from each other, and may therefore randomly be stored together in registry 412 in any sequence. In other words, local cache 520 may preferably be located anywhere within registry 412 as an undifferentiated storage location for remote element registrations. Furthermore, the specific location of local cache 412 within registry 412 may vary depending upon the particular storage sequence of the various remote element registrations. In alternate embodiments, registry 412 may likewise be implemented so that local cache 520 is external to (not integral with) registry 412. Local cache 520 is further discussed below in conjunction with FIGS. 7 through 9.

In the FIG. 5 embodiment, registry 412 may be advantageously utilized during communications between various software elements in network 110. In order to send a message to a target element in network 110, a source element preferably identifies the target element by using the corresponding SEID 514 of that target element. In network 110, a source element preferably obtains the correct SEID 514 of the target element by accessing, from registry 412, the appropriate element registration 512 that uniquely corresponds to the target element. Once a source element locates an SEID 514 for a target element using any appropriate examination technique, then the source element may use the located SEID 514 to communicate with the corresponding target element via messaging system 424 (FIG. 4). In accordance with the present invention, a query technique for locating a target element is further discussed below in conjunction with FIG. 6.

Figure 6:
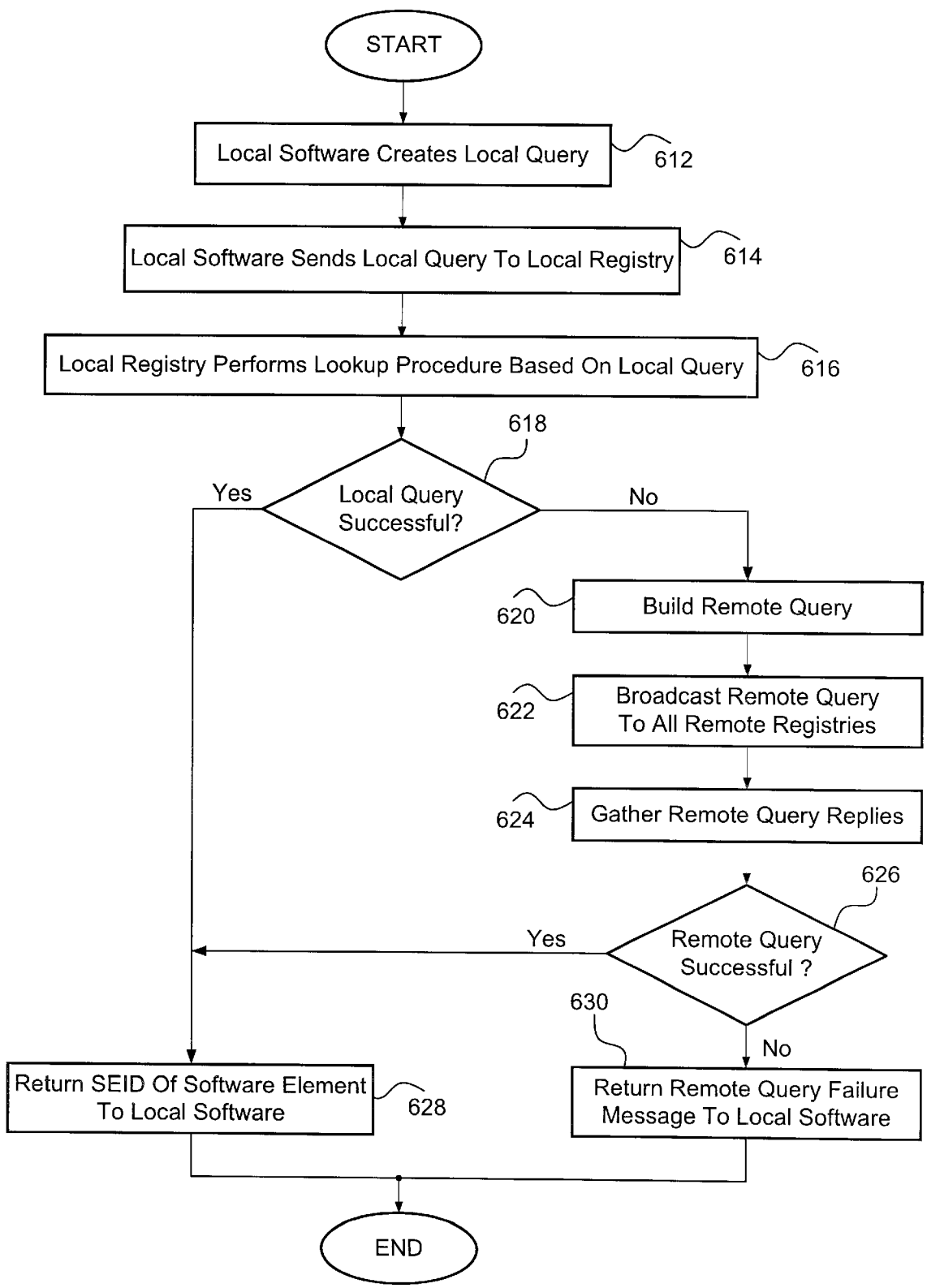
FIG. 6 is a flowchart of method steps for performing a query process, in accordance with one embodiment of the present invention.

Referring now to FIG. 6, a flowchart of method steps for performing a query process is shown, in accordance with one embodiment of the present invention. In the FIG. 6 embodiment, initially, in step 612, local software creates a local query to locate a desired target software element in network 110. Queries may be configured using any appropriate format, and may specify desired criteria such as one or more software element attributes.

In step 614, the local software preferably transmits the local query to local registry 412. In response, in step 616, local registry 412 performs a lookup procedure to determine whether any locally-registered software elements satisfy the local query transmitted from the local software. In step 618, if the local query is successful and a local software element is located that satisfies the query criteria, then, in step 628, local registry 412 returns the SEID of that local software element to the querying local software and the FIG. 6 process terminates.

However, in step 618, if the local query is not successful, then, in step 620, local registry 412 builds a remote query that preferably includes the same or similar criteria as the local query transmitted in foregoing step 614. Next, in step 622, local registry 412 broadcasts the remote query to all remote registries located on other devices across network 110 to locate a remote software element that satisfies the remote query.

In step 624, local registry 412 gathers the replies to the remote query from all of the remote registries across network 110. Then, in step 626, local registry 412 determines whether the remote query was successful in locating at least one target software element for the local software. In the FIG. 6 embodiment, such a successful remote query reply preferably includes the SEID of the remote target software element. If the remote query fails to successfully locate a target software element, then, in step 630, local registry 412 returns a remote query failure message to the local software. However, if the remote query successfully locates a target software element, then, in step 628, local registry 412 returns the SEID of the target software element to the local software that initiated the FIG. 6 query process in foregoing step 614.

The local software may then utilize the SEID of the remote target software element to communicate with the target software element. However, the foregoing remote query process (FIG. 6, steps 620 through 626) typically requires excessive messaging across network 110, and also consumes substantial amounts of processing resources. In accordance with the present invention, a technique for reducing remote queries by locally caching remote query replies in network 110 is discussed below in conjunction with FIGS. 7 through 9.

Figure 7:
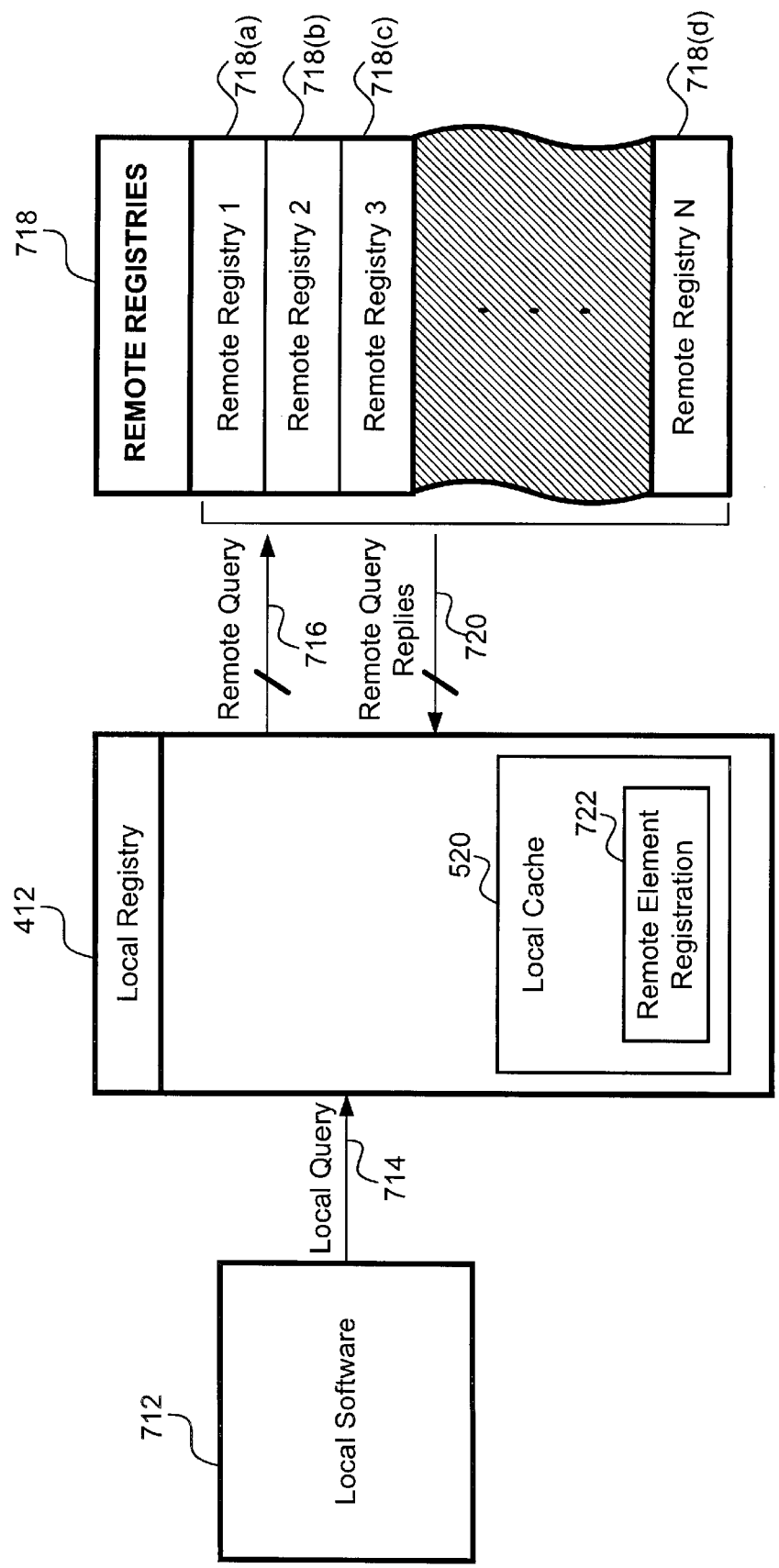
FIG. 7 is a block diagram for locally caching remote query replies, in accordance with one embodiment of the present invention.

Referring now to FIG. 7, a block diagram for locally caching remote query replies is shown, in accordance with one embodiment of the present invention. In the FIG. 7 embodiment, initially, local software 712 (such as device application 312 or any other software module in communication with network 110) creates a local query 714 to locate a desired target software element in network 110 for performing a network messaging process. Queries may be configured using any appropriate format, and may specify desired criteria such as one or more software element attributes.

Then, local software 712 preferably propagates local query 714 to local registry 412. In response, local registry 412 performs a local lookup procedure to determine whether any locally-registered software elements satisfy the local query transmitted from local software 712. In accordance with the present invention, the local lookup procedure includes checking local registry 412 for a local element registration 512 corresponding to the desired target software element of the local query.

In addition, the local lookup procedure also preferably includes examining local cache 520 in local registry 412 for a remote element registration corresponding to the desired target software element of the query. In some embodiments, local registry 412 may search for a local element registration 512 first to minimize network traffic to remote devices in the subsequent messaging process, or may alternately search for local element registration 512 concurrently with the examination of local cache 520 to locate remote element registrations.

If local query 714 is successful and a locally-registered software element is located that satisfies the local query criteria, then local registry 412 returns the SEID of that locally-registered software element to local software 712, and the FIG. 7 process terminates. However, if local query 714 is not successful, then local registry 412 builds a remote query 716 that preferably includes the same or similar criteria as local query 714. Local registry 412 then broadcasts remote query 716 to all remote registries 718 located on other devices across network 110 in the hope of locating a remote software element that satisfies the remote query. In the FIG. 7 embodiment, local registry 412 refers to remote registry list 518 to locate remote registries 718.

Next, local registry 412 preferably gathers remote query replies 720 to remote query 716 from all remote registries 718 across network 110. Then, local registry 412 determines whether remote query 716 was successful in locating at least one target software element for local software 712. In the FIG. 7 embodiment, such a successful remote query reply 720 preferably includes the SEID of the remote target software element. If remote query 716 fails to successfully locate a remote target software element, then, local registry 412 returns a remote query failure message to local software 712.

However, if remote query 716 successfully locates a remote target software element, then, local registry 412 advantageously creates a remote element registration 722 that corresponds to, and uniquely identifies, the remote target software element. Local registry 412 then stores remote element registration 722 into local cache 520 as an integral part of local registry 412. In the FIG. 7 embodiment, remote element registration 722 preferably includes a unique software element identifier (SEID) to identify and locate the remote target software element. Local registry 412 also returns the SEID of the remote target software element to local software 712.

Local software 712 may then utilize the SEID of the remote target software element to efficiently communicate with the remote target software element. Because the foregoing remote query process typically requires excessive messaging across network 110, and also consumes substantial amounts of processing resources, the present invention therefore gradually builds up a local cache of information about remote software elements that are of interest to local software 712 to effectively reduce the amount of remote querying necessary over network 110.

Figure 8:
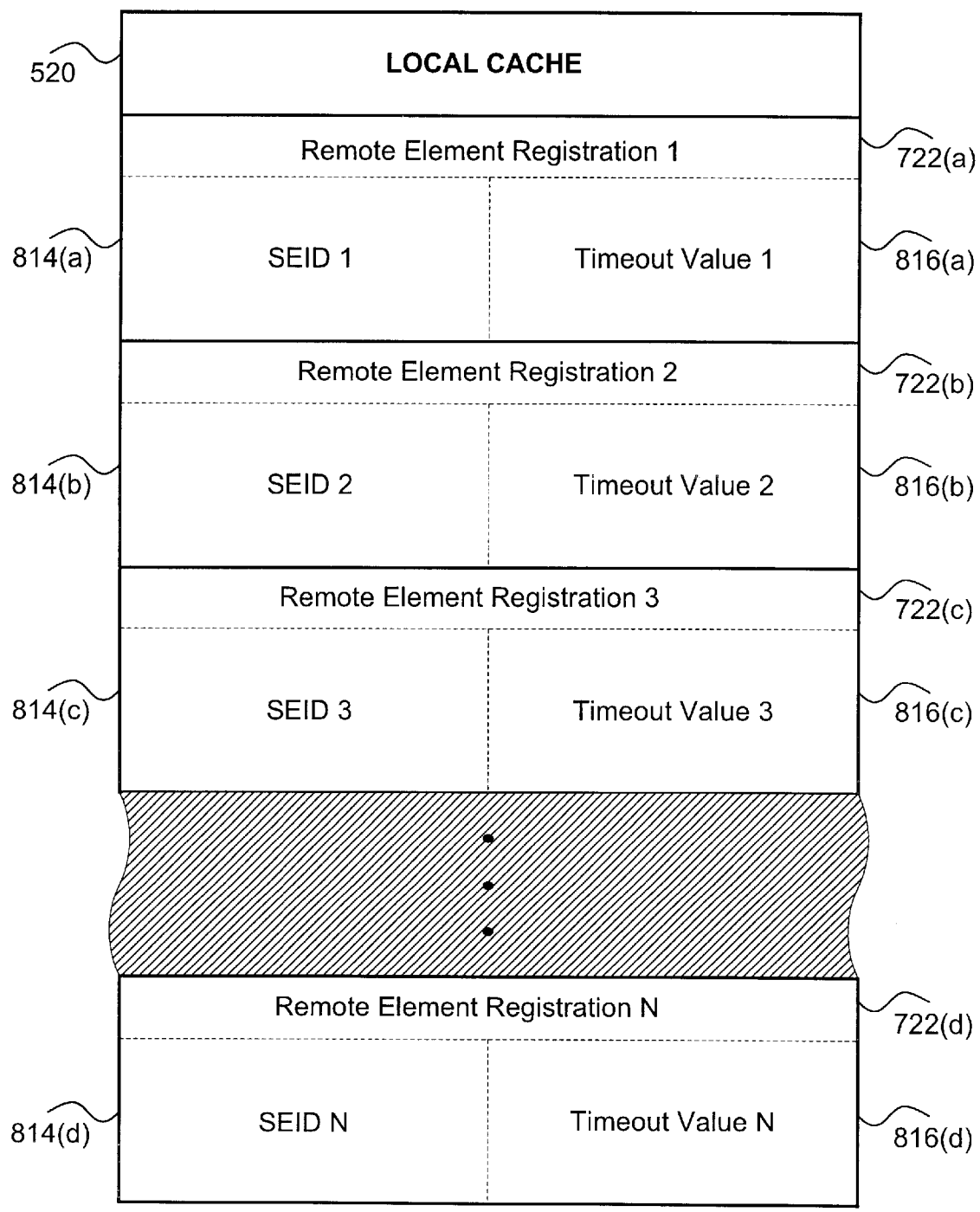
FIG. 8 is a diagram for one embodiment of the local cache from FIG. 7, in accordance with the present invention.

Referring now to FIG. 8, a diagram for one embodiment of the FIG. 7 local cache 520 is shown, in accordance with the present invention. In the FIG. 8 embodiment, local cache 520 is implemented as a contiguous part of local registry 412 and preferably includes a remote element registration 1 (722(a)) through a remote element registration N (722(d)). Each FIG. 8 remote element registration 722(a) through 722(d) preferably corresponds to a remote software element in network 110. For example, any one of remote element registration 512(a) through 512(d) may uniquely correspond to an associated software element from remote network software 316 on remote devices across network 110.

In the FIG. 8 embodiment, each remote element registration 722(a) through 722(d) preferably includes a software element identifier (SEID) 814 and a corresponding timeout value 816. Therefore, remote element registration 1 (722(a)) through remote element registration N (722(d)) each preferably include a corresponding respective SEID 1 (814(a)) through SEID N (814(d)), and a associated respective timeout value 1 (816(a)) through timeout value N (816(d)). In alternate embodiments, local cache 520 may readily be configured to include various components in addition to, or instead of, those shown in the FIG. 8 embodiment.

In the FIG. 8 embodiment, each SEID 1 (814(a)) through SEID N (814(d)) preferably includes a global unique identifier (GUID) and a software element local handle (SELH) that are used to uniquely identify a specific remote software element in network 110. Timeout value 1 (816(*a*)) through timeout value N (816(*d*)) preferably each include a value corresponding to a timeout duration period for the associated software element. In the FIG. 8 embodiment, after the timeout duration period has expired, then local registry 412 preferably may delete the corresponding remote element registration 722 to ensure that local cache 520 only maintains relatively recent remote query replies 720 to advantageously conserve memory resources in memory 216.

Timeout value 816 may be formatted and utilized in any effective manner. For example, timeout value 816 may include a value that is periodically decremented, and when timeout value 816 reaches zero, then local registry 412 may responsively delete the corresponding remote element registration 722. Alternately, timeout value 816 may include a time or date stamp to indicate when remote element registration 722 was created. Local registry 412 may then compare the time or date stamp with the current time or date to determine when to delete the corresponding remote element registration 722.

In some embodiments, each remote element registration 722 may also include a remote element attribute list (not shown). The remote element attribute list is analogous to the local attribute lists 516 discussed in conjunction with FIG. 5, and may include any appropriate and relevant information related to the corresponding remote element registered in local cache 520. For example, such relevant information may include, but is not limited to, an element manufacturer, an element model, a version level, and various other element features.

Figure 9:
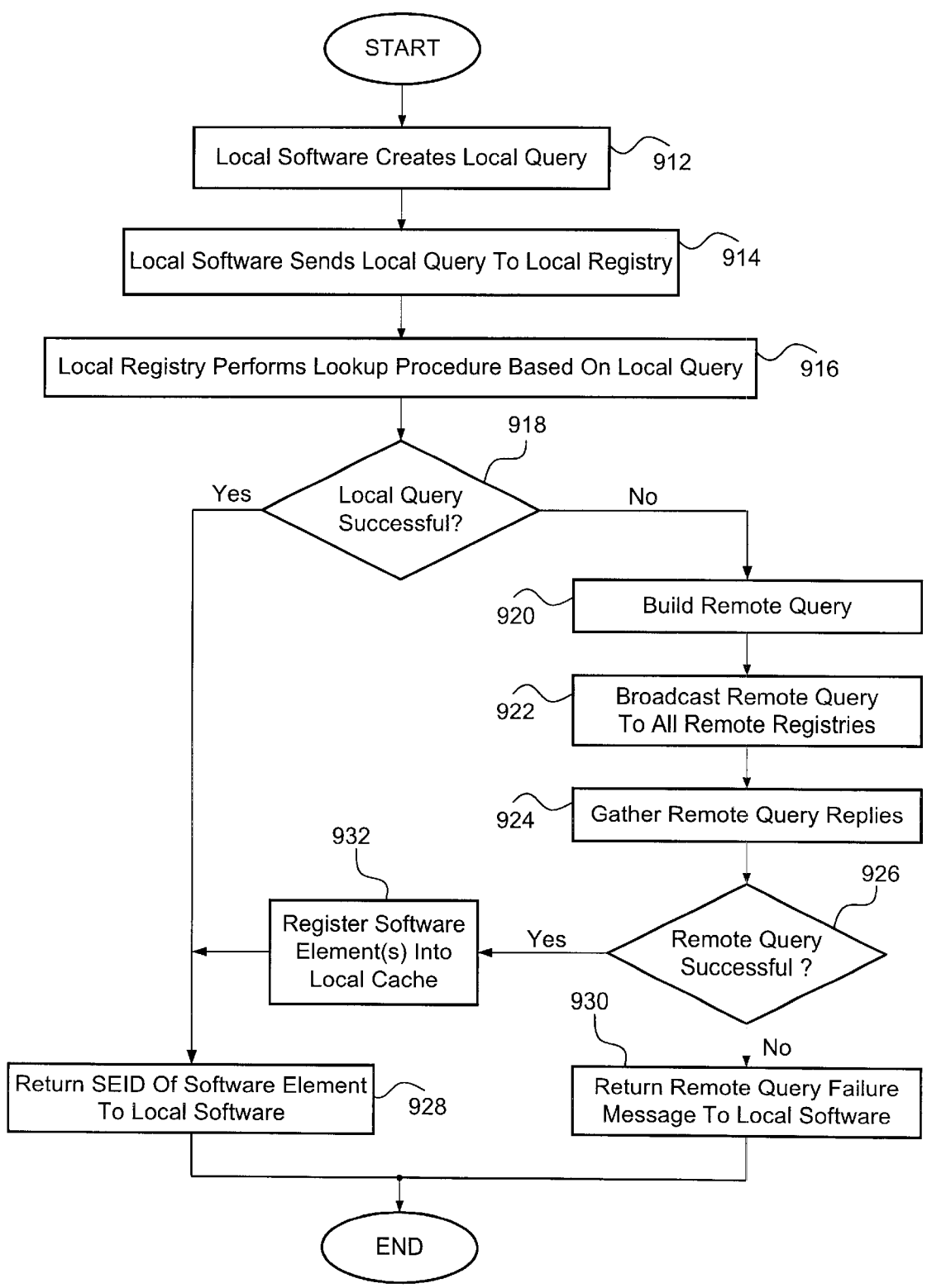
FIG. 9 is a flowchart of method steps for locally caching remote query replies, in accordance with one embodiment of the present invention.

Referring now to FIG. 9, a flowchart of method steps for locally caching remote query replies is shown, in accordance with one embodiment of the present invention. Although the FIG. 9 process is discussed in the context of a single local registry 412, in practice, the FIG. 9 process may readily be performed by any registry 412 in network 110.

In the FIG. 9 embodiment, initially, in step 912, local software 712 preferably creates a local query 714 to locate a desired target software element in network 110. Queries may be configured using any appropriate format, and may specify desired criteria such as one or more software element attributes.

In step 914, local software 712 preferably transmits local query 714 to local registry 412. In response, in step 916, local registry 412 performs a local lookup procedure to determine whether any locally-registered software elements satisfy the local query transmitted from local software 712. As discussed above in conjunction with FIG. 7, local registry 412 preferably performs the local lookup procedure to find any local element registrations 512 that satisfy the local query criteria, and also examines the remote element registrations 722 in local cache 520 to determine whether any locally-registered remote software elements may satisfy the local query criteria for the target software element.

In step 918, if local query 714 is successful and a locally-registered software element is located that satisfies the criteria of local query 714, then, in step 928, local registry 412 returns the SEID of that locally-registered software element to the querying local software 712 and the FIG. 9 process terminates. However, in step 918, if local query 714 is not successful, then, in step 920, local registry 412 builds a remote query 716 that preferably includes the same or similar criteria as the local query 714 transmitted in foregoing step 914. Next, in step 922, local registry 412 broadcasts remote query 716 to all remote registries 718 located on other devices across network 110 in the hope of locating a remote software element that satisfies remote query 716.

In step 924, local registry 412 gathers the remote query replies 720 from all remote registries 718 across network 110. Then, in step 926, local registry 412 determines whether remote query 716 was successful in locating at least one remote target software element for local software 712. In the FIG. 9 embodiment, such a successful remote query reply 720 preferably includes the SEID 814 of the remote target software element. If remote query 716 fails to successfully locate a remote target software element, then, in step 930, local registry 412 returns a remote query failure message to local software 712.

However, if remote query 716 successfully locates a remote target software element, then, in step 932, local registry 412 preferably creates and adds a corresponding remote element registration 722 to local cache 720 in local registry 412 to advantageously register the located remote target software element(s). In step 928, local registry 412 then preferably returns the SEID 814 of the remote target software element to local software 712 that initiated the FIG. 9 query process in foregoing step 914. Local software 712 may then utilize the SEID 814 of the remote target software element to communicate with the remote target software element.

In some embodiments of the present invention, local registry 412 may also utilize the foregoing techniques of remote query broadcasting and local caching of successful remote query replies (discussed above in conjunction with steps 920 through 932 of FIG. 9) to periodically construct and broadcast generalized remote queries to remote registries 718. Query criteria and formats for such generalized remote queries may be selected by any appropriate method, depending, for example, upon the requirements of local software 712 and the types of remote software elements being queried. This generalized remote query technique permits local registries 412 to build the contents of their respective local caches 520 to ensure that each local cache 520 maintains current remote element registrations 722. In the FIG. 9 embodiment, local cache 412 registers the remote target software element(s) into local cache 520 soon after gathering the remote query replies 720. However, in alternate embodiments, the present invention may also locally register the remote target software element(s) at any other appropriate and effective point in time.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for locally-caching remote information in an electronic network, comprising:

a local element coupled to said electronic network and configured to broadcast a remote query and receive a remote query reply, said local element including a local registry that forms part of network software for a device in said electronic network;

a local cache coupled to said local element and configured to selectively store said remote information corresponding to said remote query reply; and a local software module that creates a local query and propagates said local query to said local registry which responsively performs said local query, said local registry creating said remote query based upon said local query whenever said local query is unsuccessful in locating a locally-registered target software element for a network messaging process, said local registry broadcasting said remote query to remote registries across said electronic network, said remote query including query criteria corresponding to a remote target software element, said local registry evaluating said remote query reply to determine whether said remote query was successful in locating said remote target software element in said remote registries, said local registry creating a remote element registration corresponding to said remote target software element whenever said remote query is successfully answered, said local registry then storing said remote element registration in said local cache to facilitate future messages from said local software module to said remote target software element, said remote element registration including a timeout value, said local registry deleting said remote element registration when said timeout value expires.

2. The system of claim 1 wherein said timeout value is periodically decremented, said local registry deleting said remote element registration when said timeout value reaches a value of zero.

3. The system of claim 1 wherein said timeout value includes a time stamp, said local registry comparing said time stamp with a current time and responsively deleting said remote element registration when a time limit value is exceeded.

4. A system for locally-caching remote information in an electronic network, comprising:

a local element coupled to said electronic network and configured to broadcast a remote query and receive a remote query reply, said local element including a local registry that forms part of network software for a device in said electronic network;

a local cache coupled to said local element and configured to selectively store said remote information corresponding to said remote query reply; and a local software module that creates a local query and propagates said local query to said local registry which responsively performs said local query, said local registry creating said remote query based upon said local query whenever said local query is unsuccessful in locating a locally-registered target software element for a network messaging process, said local registry broadcasting said remote query to remote registries across said electronic network, said remote query including query criteria corresponding to a remote target software element, said local registry evaluating said remote query reply to determine whether said remote query was successful in locating said remote target software element in said remote registries, said local registry creating a remote element registration corresponding to said remote target software element whenever said remote query is successfully answered, said local registry then storing said remote element registration in said local cache to facilitate future messages from said local software module to said remote target software element, said local registry periodically broadcasting a generalized remote query to said remote registries to thereby ensure that said remote information in local cache remains current.

5. A method for locally-caching remote information in an electronic network, comprising the steps of:

creating a local query with a local software module and propagating said local query to a local registry which responsively performs said local query;

broadcasting a remote query using a local element coupled to said electronic network, said local element including said local registry that forms part of network software for a device in said electronic network, said local registry creating said remote query based upon said local query whenever said local query is unsuccessful in locating a locally-registered target software element for a network messaging process, said local registry broadcasting said remote query to remote registries across said electronic network, said remote query including query criteria corresponding to a remote target software element;

receiving a remote query reply from said electronic network, said local registry evaluating said remote query reply to determine whether said remote query was successful in locating said remote target software element in said remote registries; and storing said remote information selectively into a local cache based on said remote query reply, said local registry creating a remote element registration corresponding to said remote target software element whenever said remote query is successfully answered, said local registry then storing said remote element registration in said local cache to facilitate future messages from said local software module to said remote target software element, said remote element registration including a timeout value, said local registry deleting said remote element registration when said timeout value expires.

6. The method of claim 5 wherein said timeout value is periodically decremented, said local registry deleting said remote element registration when said timeout value reaches a value of zero.

7. The method of claim 5 wherein said timeout value includes a time stamp, said local registry comparing said time stamp with a current time and responsively deleting said remote element registration when a time limit value is exceeded.

8. A method for locally-caching remote information in an electronic network, comprising the steps of:

creating a local query with a local software module and propagating said local query to a local registry which responsively performs said local query;

broadcasting a remote query using a local element coupled to said electronic network, said local element including said local registry that forms part of network software for a device in said electronic network, said local registry creating said remote query based upon said local query whenever said local query is unsuccessful in locating a locally-registered target software element for a network messaging process, said local registry broadcasting said remote query to remote registries across said electronic network, said remote query including query criteria corresponding to a remote target software element;

receiving a remote query reply from said electronic network, said local registry evaluating said remote query reply to determine whether said remote query was successful in locating said remote target software element in said remote registries; and storing said remote information selectively into a local cache based on said remote query reply, said local registry creating a remote element registration corresponding to said remote target software element whenever said remote query is successfully answered, said local registry then storing said remote element registration in said local cache to facilitate future messages from said local software module to said remote target software element, said local registry periodically broadcasting a generalized remote query to said remote registries to thereby ensure that said remote information in local cache remains current.

* * * * *